(12) United States Patent
Horne

(10) Patent No.: US 10,806,151 B2
(45) Date of Patent: Oct. 20, 2020

(54) DEVICE AND METHOD FOR SHAPING BAKED GOODS

(71) Applicant: Eve Horne, Lauderhill, FL (US)

(72) Inventor: Eve Horne, Lauderhill, FL (US)

( * ) Notice: Subject to any disclaimer, the term of this patent is extended or adjusted under 35 U.S.C. 154(b) by 101 days.

(21) Appl. No.: 15/596,859

(22) Filed: May 16, 2017

(65) Prior Publication Data

US 2018/0332862 A1 Nov. 22, 2018

(51) Int. Cl.
*A21B 3/13* (2006.01)
*A47J 37/01* (2006.01)
(Continued)

(52) U.S. Cl.
CPC ............ *A21B 3/132* (2013.01); *A21B 3/13* (2013.01); *A21B 3/135* (2013.01); *A21B 3/18* (2013.01); *A21C 15/04* (2013.01); *A47J 37/01* (2013.01)

(58) Field of Classification Search
CPC ........... A21B 3/13; A21B 3/131; A21B 3/135; A21B 3/15; A21B 3/155; A21C 11/00; A21C 11/10; A21C 11/106; A21C 15/04; A21C 15/02; B26D 2001/0033; B26D 2001/004; B26D 2001/006;
(Continued)

(56) References Cited

U.S. PATENT DOCUMENTS 1,112,991 A * 10/1914 Dufner ................ B26D 1/0006
83/857
1,446,767 A * 2/1923 Price ...................... B26D 3/185
30/303
(Continued)

FOREIGN PATENT DOCUMENTS

WO 93/07755 4/1993
WO WO-9307755 A1 * 4/1993 ............... A21B 3/13

OTHER PUBLICATIONS

Food52 NPL, published Sep. 23, 2013, https://food52.com/blog/7720-a-better-way-to-get-cakes-out-of-their-pans (Year: 2013).*
Stack Cakes NPL, published Dec. 31, 2012, https://www.savingdessert.com/chocolate-wafer-cookie-stack-cakes/ (Year: 2012).*
Barktime NPL, published Nov. 11, 2014, http://barktime.co.uk/2014/11/11/baking-mad-quick-and-easy-chocolate-brownies/ (Year: 2014).*
(Continued)

*Primary Examiner* — Drew E Becker
*Assistant Examiner* — Bryan Kim
(74) *Attorney, Agent, or Firm* — Mark C. Johnson; Johnson Dalal

(57) ABSTRACT

A device and method for shaping baked goods that includes a container and a shaping rack engaging a semi-solid consumable substance within the container to enable creative and decorative shaping and decoration of the semi-solid consumable substance. The shaping rack comprises a perimeter frame section that encloses a framed shaping section. The framed shaping section forms multiple framed sub-sections having geometric shapes. The shaping rack is superimposed over the semi-solid consumable substance. The shaping rack translates, with a sharp edge, toward a bottom surface of the semi-solid consumable substance. In translation, the shaping rack penetrates the semi-solid consumable substance to a determined depth. This allows formation of consumable substance units corresponding in shape, respectively, to the geometric shapes of the framed sub-sections. Blocks on opposite ends of the semi-solid consumable substance restrict penetration by the shaping rack past a predetermined depth.

9 Claims, 15 Drawing Sheets

(51) Int. Cl.
*A21B 3/18* (2006.01)
*A21C 15/04* (2006.01)

(58) Field of Classification Search
CPC ............... B26D 2001/008; B26D 1/04; B26D 1/45547; B26D 1/553; B26D 3/006; B26D 3/008185; B26D 3/24; B26D 3/245; B26D 2210/02; B26D 2210/04; B26D 2210/08; A47J 37/01; A23G 7/0018; A23L 5/15; A23L 5/17
USPC ....... 426/512, 516, 518, 520, 523, 524, 389, 426/391, 276–279, 281–284, 292; 99/537–567; 83/856, 857, 858; 30/115, 30/116, 124, 125, 173, 303–305; D7/672, D7/673, 675, 676, 693, 696, 381
See application file for complete search history.

(56) References Cited

U.S. PATENT DOCUMENTS

| | | | | |
|---|---|---|---|---|
| 1,463,941 A * | 8/1923 | Cusimano | ................ | B26D 1/52 30/303 |
| 1,867,657 A * | 7/1932 | Dellinger | ................ | B26D 3/185 83/435.18 |
| 1,874,511 A * | 8/1932 | Habermaas | ............ | A21C 3/021 425/299 |
| 2,081,078 A * | 5/1937 | Watson | ................ | A21B 3/13 126/373.1 |
| 2,158,667 A * | 5/1939 | Rieck | ................ | B26D 1/553 83/157 |
| 2,254,759 A * | 9/1941 | Stainbrook | .......... | A21C 11/106 426/27 |
| 2,403,190 A * | 7/1946 | Parraga | ................ | B26B 27/002 30/117 |
| 2,490,545 A * | 12/1949 | Roth | ................ | A21C 11/106 249/132 |
| 2,526,811 A * | 10/1950 | Dawson | ................ | A21C 11/106 83/109 |
| 2,711,585 A * | 6/1955 | Bush | ................ | B26F 1/40 83/452 |
| 2,734,465 A * | 2/1956 | Head | ................ | A21C 11/10 426/502 |
| 2,964,844 A * | 12/1960 | Steward | ................ | B26B 27/002 30/116 |
| 3,060,838 A * | 10/1962 | Priore | ................ | A21C 15/04 30/114 |
| 3,347,296 A * | 10/1967 | Rothman | ................ | B26D 3/30 269/87.2 |
| 3,410,699 A * | 11/1968 | Peters | ................ | B65D 75/327 426/104 |
| 3,789,750 A * | 2/1974 | Beck | ................ | A21C 11/16 99/536 |
| 3,987,541 A * | 10/1976 | Sieczkiewicz | .......... | A21C 15/04 30/114 |
| 4,195,402 A * | 4/1980 | Leffer | ................ | B26D 1/547 30/114 |
| 4,213,241 A * | 7/1980 | Haapala | ................ | A21C 15/04 30/115 |
| 4,334,557 A * | 6/1982 | YaSenka | ................ | B26D 1/553 141/331 |
| 4,383,365 A * | 5/1983 | Metzigian | ................ | B26D 7/00 30/114 |
| 4,452,419 A | 6/1984 | Saleeba | | |
| 4,606,716 A * | 8/1986 | McCaffrey | ................ | A21C 5/00 30/130 |
| 4,672,873 A * | 6/1987 | Kinser | ................ | B26D 1/547 83/200.1 |
| 5,337,480 A * | 8/1994 | Codikow | ................ | B26D 1/0006 30/114 |
| 5,388,390 A * | 2/1995 | Finkowski | ................ | B65B 25/06 425/298 |
| 5,446,965 A * | 9/1995 | Makridis | ................ | A21C 15/04 30/303 |
| 5,579,582 A | 12/1996 | Carlson | | |
| 5,664,474 A * | 9/1997 | Punt | ................ | A47J 47/005 269/290 |
| 5,692,424 A * | 12/1997 | Wallace | ................ | A47J 36/00 83/167 |
| D393,184 S * | 4/1998 | Chambers | ................ | D25/199 |
| 5,848,470 A * | 12/1998 | Anderson | ................ | A21C 11/00 30/277 |
| 5,924,352 A * | 7/1999 | Lothe | ................ | B26B 29/06 220/528 |
| 6,318,222 B1 * | 11/2001 | Weinman, Jr. | .......... | B26D 3/28 144/175 |
| 6,505,809 B1 | 1/2003 | Reed | | |
| 7,480,999 B2 * | 1/2009 | Atwater | ................ | A21C 11/106 30/289 |
| 7,770,751 B2 * | 8/2010 | Henry | ................ | A21B 3/135 220/507 |
| 7,779,739 B2 * | 8/2010 | Peterson | ................ | B26D 3/26 83/858 |
| D632,140 S * | 2/2011 | Burstein | ................ | D7/673 |
| 8,146,468 B1 * | 4/2012 | Kachelries | ............ | B26D 1/553 30/117 |
| D658,950 S * | 5/2012 | Plank | ................ | D7/675 |
| D664,814 S * | 8/2012 | Lepore | ................ | D7/672 |
| 8,389,038 B2 * | 3/2013 | Pivik | ................ | A22C 7/003 100/39 |
| 8,857,325 B2 * | 10/2014 | Brown | ................ | A21C 15/04 99/537 |
| 8,936,461 B2 * | 1/2015 | Palazzolo | ............ | A23G 3/0273 425/298 |
| 9,102,096 B2 * | 8/2015 | Palazzolo | ............ | A21C 11/10 |
| 9,107,421 B2 * | 8/2015 | Campbell | ............ | A21B 3/135 |
| 9,504,259 B2 * | 11/2016 | White | ................ | A21C 11/106 |
| 9,630,334 B2 * | 4/2017 | Garcia | ................ | B26D 3/245 |
| 9,668,487 B2 * | 6/2017 | Starr | ................ | A21C 15/04 |
| 2003/0072860 A1 * | 4/2003 | Reed | ................ | A21B 3/132 426/512 |
| 2004/0020055 A1 * | 2/2004 | Zuker | ................ | A21C 15/04 30/114 |
| 2005/0132579 A1 * | 6/2005 | Sartori | ................ | A21C 11/106 30/299 |
| 2006/0218799 A1 * | 10/2006 | Kaposi | ................ | B26B 5/008 30/302 |
| 2006/0272162 A1 * | 12/2006 | Atwater | ................ | A21C 11/106 30/303 |
| 2007/0022611 A1 * | 2/2007 | Verbiest | ................ | A21C 15/04 30/114 |
| 2008/0229938 A1 * | 9/2008 | Hutto | ................ | A47J 9/005 99/537 |
| 2009/0193983 A1 * | 8/2009 | So | ................ | B26D 1/0006 99/537 |
| 2011/0030222 A1 * | 2/2011 | Chen | ................ | A21C 15/04 30/114 |
| 2011/0146502 A1 | 6/2011 | Mansur | | |
| 2012/0060373 A1 * | 3/2012 | Spreen | ................ | A21C 15/04 30/114 |
| 2015/0069215 A1 * | 3/2015 | Kohnen | ................ | A21B 3/13 249/203 |
| 2015/0283711 A1 * | 10/2015 | Crichton | ................ | B26B 3/04 83/880 |
| 2015/0343656 A1 * | 12/2015 | Repac | ................ | B26D 3/18 83/167 |
| 2016/0158956 A1 * | 6/2016 | Repac | ................ | A47J 43/25 241/95 |

OTHER PUBLICATIONS

Dinner then Dessert NPL, published Jul. 7, 2016, https://dinnerthendessert.com/cookie-dough-brownies/ (Year: 2016).*

Handle the Heat NPL, published Oct. 17, 2014, https://web.archive.org/web/20141017075905/https://www.handletheheat.com/mexican-brownies-with-brown-sugar-glaze/ (Year: 2014).*

* cited by examiner

DEVICE AND METHOD FOR SHAPING BAKED GOODS

FIELD OF THE INVENTION

The present invention relates generally to a device and method for shaping consumable good, e.g., baked goods, and, more particularly, relates to a device and method facilitating in creating geometric shapes using a consumable-good container corresponding in shape to the geometric shapes defined by the device.

BACKGROUND OF THE INVENTION

Generally, cakes having a three-dimensional form or shape are typically baked in specially molded pans to confine the semi-liquid materials during the baking process and to shape the baked materials into the desired form. As a baked product, a cake has a relatively solid consistency which allows for bakers or cake decorators to apply decorative features such as painting on images in frosting or layers of cake separated by layers of frosting or tiered structures separated by support columns which are usually inedible.

It is known in the art that consumers often like to have well decorated cakes at, for example, birthday parties, wedding ceremonies, corporate events, greetings, etc. Cakes have traditionally been prepared to have a pleasing and attractive appearance which encourages interest in the cake, if not actual manipulation. Furthermore, other types of decorative foods, such as canapes, hors d'oeuvres, etc., are commonly presented in an attractive array, which often encourages consumers thereof to inspect closely, if not actually manipulate, the food.

There are numerous situations in which a cake, having a relatively soft, planar material needs to be cut into a particular shape, and then decorated with frosting or a similar material, to create on the cut shape a design. Other examples that require such glazing include cookies, biscuits, canapes, and tea sandwiches, as well as items such as ceramic tiles and ornaments. It is often desirable to cut geometric shapes, such as puzzle, square, and figurine shapes into the cake. Sometimes, only an upper section of the cake is required to be cut in such a geometric manner, while a lower section remains whole.

Therefore, a need exists to overcome the problems with the prior art as discussed above.

SUMMARY OF THE INVENTION

The invention provides a device and method for shaping baked goods that overcomes the hereinafore-mentioned disadvantages of the heretofore-known devices and methods of this general type and that provides a container for baking a cake, and a shaping rack having nonlinear profiles that superimposes and presses into the cake to translate the nonlinear profiles into the cake.

With the foregoing and other objects in view, there is provided, in accordance with the invention, a device and method that enables creative, decorative shaping and frosting of baked goods. The device and method modulates a viscous consumable substance in a container to form a semi-solid consumable substance, and then shapes the semi-solid consumable substance with a shaping rack defined by nonlinear profiles, e.g., geometric shapes, such that the semi-solid consumable substance forms consumable substance units corresponding in shape, respectively, to the nonlinear profiles.

In one embodiment, the device provides a container having a base surface and sidewalls. The sidewalls extend from the base surface and terminate at a perimeter edge. The sidewalls and the base surface define a cavity. In some embodiments, the container may modulate a viscous consumable substance to form a semi-solid consumable substance. The semi-solid consumable substance may then be shaped, cut, and decorated as desired.

In another embodiment, the device provides a substantially planar shaping rack having a continuous perimeter frame section that encloses a framed shaping section. The framed shaping section includes a plurality of framed sub-sections enclosing and defining a plurality of geometric shapes, such as puzzle shapes.

In another embodiment, each of the framed sub-sections defined by an upper surface and a bottom surface forming a sharp edge. The framed sub-sections are also defined by a first side having a first side non-linear profile. The framed sub-sections are also defined by a second side disposed at an orthogonal orientation with respect to the first side and having a second side non-linear profile different than the first side non-linear profile.

In accordance with another feature, an embodiment of the present invention includes a pair of handles that extend generally coplanar, and from opposite ends of the continuous perimeter frame section of the shaping rack.

In accordance with a further feature of the present invention, the handles are sized and dimensioned to rest on a pair of blocks.

In accordance with a further feature of the present invention, a pair of blocks may be used to support the handles; and thereby elevate the shaping rack at a predetermined depth in the semi-solid consumable substance, so that the shaping rack penetrates the semi-solid consumable substance up to a predetermined depth set by the height of the blocks.

In accordance with the present invention, a method for shaping a baked good comprises an initial step of providing a container having a base surface and sidewalls, the sidewalls extending from the base surface and terminating at a perimeter edge, the sidewalls and the base surface defining a cavity.

Another step of the method includes providing a substantially planar shaping rack having a continuous perimeter frame section enclosing a framed shaping section, the framed shaping section including a plurality of framed sub-sections enclosing and defining a plurality of geometric shapes, each of the plurality of framed sub-sections having an upper surface, a bottom surface defined by a sharp edge, a first side having a first side non-linear profile, and a second side disposed at an orthogonal orientation with respect to the first side and having a second side non-linear profile different than the first side non-linear profile. Another step may include of placing a viscous consumable substance within the cavity.

In yet another step, the process may include modulating the liquid-based consumable substance until it becomes at least a semi-solid consumable substance defined by an upper face and a lower face adjacent to the base surface of the container.

Another step includes superimposing the planar shaping rack on the perimeter edge of the container, with the bottom surface of each of the plurality of framed sub-sections facing toward the cavity.

In some embodiments, a step includes inverting the container and the planar shaping rack.

Additionally, another step includes removing the container, such that the framed shaping section supports a weight of the semi-solid consumable substance.

Additionally, a step in the process may include translating, with the cutting edge of the plurality of framed sub-sections acting as a leading edge, toward the bottom surface of the semi-solid consumable substance forming consumable substance units corresponding in shape, respectively, to the plurality of geometric shapes.

In accordance with yet another feature, an embodiment of the present invention includes an additional step of translating, with the sharp edge of the plurality of framed sub-sections acting as a leading edge, toward the bottom surface of the semi-solid consumable substance to a predetermined depth.

In accordance with a further feature of the present invention, an additional step includes superimposing the planar shaping rack on the upper surface of the semi-solid consumable substance with the continuous perimeter frame section contouring the perimeter edge of the container.

In accordance with a further feature of the present invention, an additional step includes providing a pair of handles extending from the continuous perimeter frame section of the shaping rack, the pair of handles being oppositely disposed on the perimeter frame.

In accordance with a further feature of the present invention, an additional step includes providing a pair of blocks on opposite ends of the semi-solid consumable substance, the pair of blocks configured to support the pair of handles, whereby the shaping rack is elevated above the semi-solid consumable substance when the pair of handles rest on the pair of blocks;

In accordance with a further feature of the present invention, an additional step includes cutting a cross section of the semi-solid consumable substance approximately across the upper surface of the framed shaping section at the predetermined depth.

In accordance with a further feature of the present invention, the plurality of framed sub-sections enclose and define a plurality of puzzle shapes.

In accordance with a further feature of the present invention, the first side non-linear profile of one of the plurality of framed sub-sections corresponds in shape to the first side non-linear profile of another of the plurality of framed sub-sections adjacent thereto and the second side non-linear profile of one of the plurality of framed sub-sections corresponds in shape to the second side non-linear profile of another of the plurality of framed sub-sections adjacent thereto.

In accordance with a further feature of the present invention, an additional step includes baking or freezing the viscous consumable substance to form the semi-solid consumable substance.

In accordance with a further feature of the present invention, an additional step includes stacking multiple semi-solid consumable substance in an aligned, vertical arrangement.

In accordance with a further feature of the present invention, an additional step includes decoratively coating a creamy glaze on the semi-solid consumable substance.

In accordance with a further feature of the present invention, an additional step includes scraping excess creamy glaze from the semi-solid consumable substance with the continuous perimeter frame section of the shaping rack.

Although the invention is illustrated and described herein as embodied in a device and method for shaping baked goods, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the container and the shaping rack.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
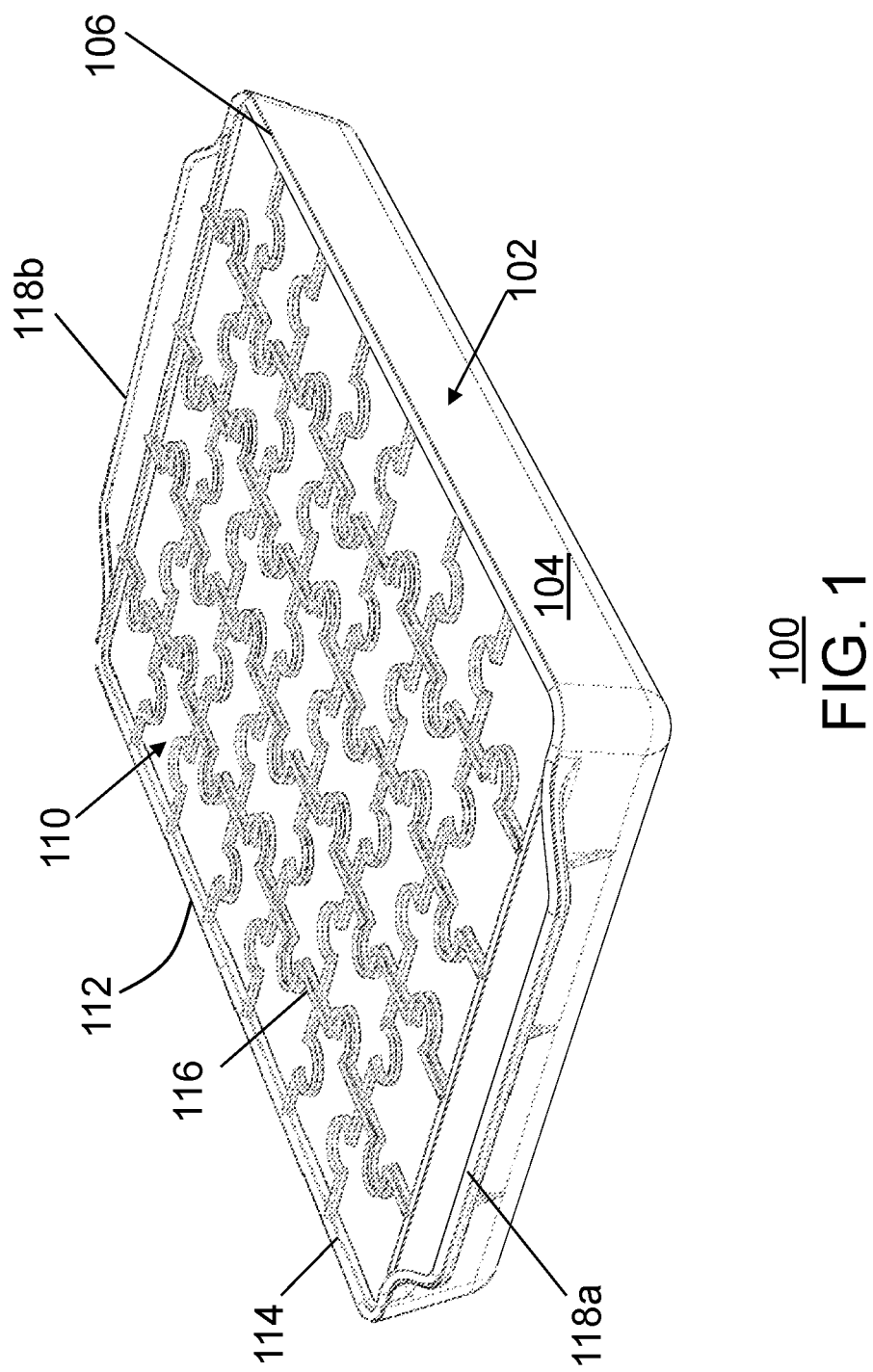
FIG. 1 is a perspective view of a device for shaping baked goods, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

With reference to FIGS. 1, 3, 8, and 14, the present invention provides a novel and efficient device 100 and method for shaping baked goods, in particular baked goods that are housed within a container 102 and in the form of a semi-solid consumable substance 300. In addition, embodiments of the invention enable the superimposition of a shaping rack 112 over the semi-solid consumable substance 300. The shaping rack 112 is defined by framed sub-sections 120a, 120b, 120c, 120n, wherein the numeral "n" represents any number greater than 1. The framed sub-sections 120a, 120b, 120c, 120n can be seen having geometric shapes, such as puzzle or square shapes.

Figure 10:
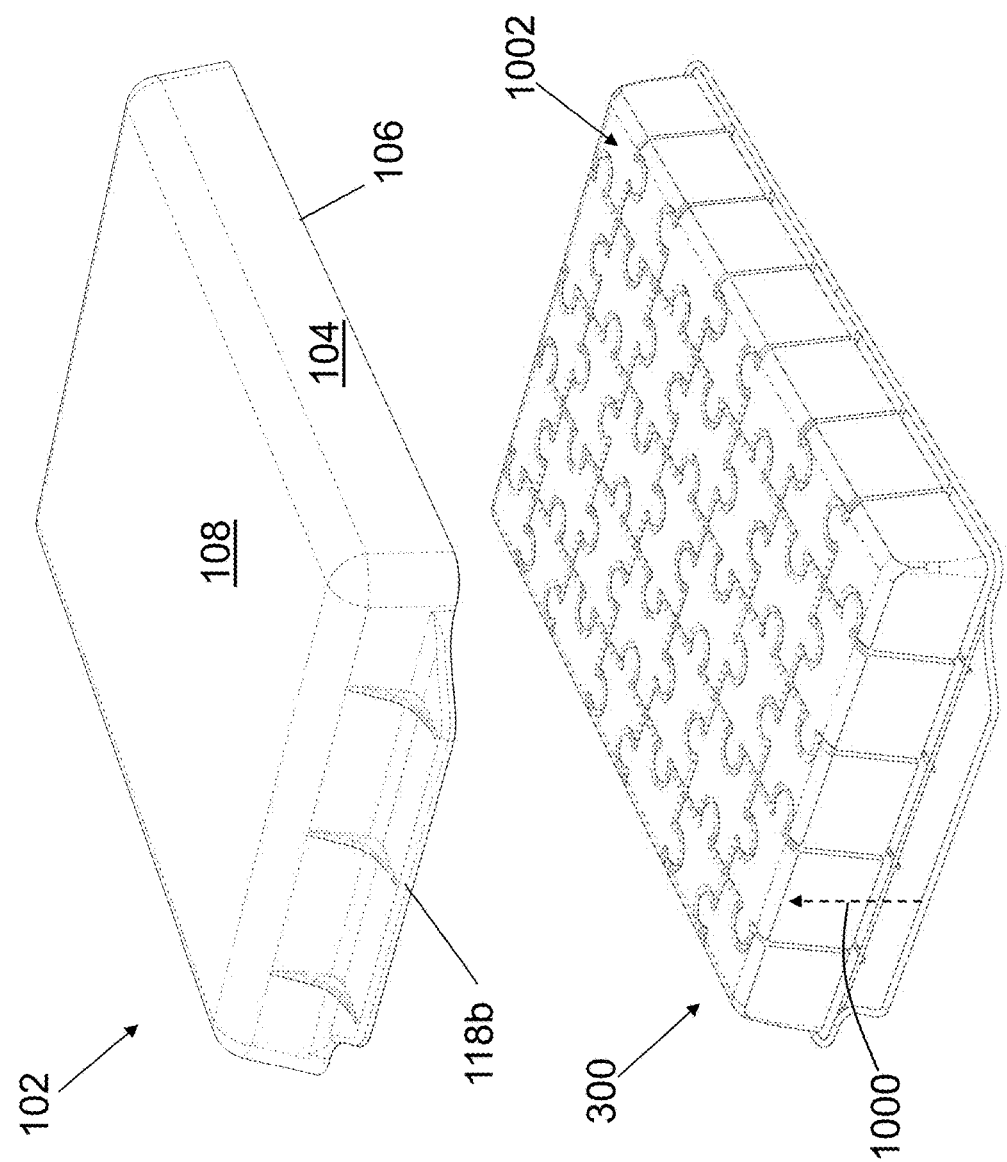
FIG. 10 is a perspective view of the semi-solid consumable substance removed from the inverted container, in accordance with the present invention.

To form consumable substance units 302a, 302b, 302c, 302n, the shaping rack 112 is translated, leading with a sharp edge 132 through the semi-solid consumable substance 300, towards a base surface 108 of the container 102 (as best shown in FIG. 10). By urging the shaping rack 112 in this direction, consumable substance units 302a, 302b, 302c corresponding in shape, respectively, to the geometric shapes of the shaping rack 112 are formed from the semi-solid consumable substance 300. Additional embodiments of the present invention include stacking, cutting, and frosting the semi-solid consumable substance 300.

Referring specifically now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example of a device 100, as shown in FIG. 1, includes a container 102 that facilitates in modulating a viscous consumable substance to form a semi-solid consumable substance 300. The container 102 comprises a base surface 108 and sidewalls 104 that form a cavity 110. The sidewalls 104 extend from the base surface 108 and terminate at a perimeter edge 106.

In some embodiments, the container 102 is configured to enable modulation of a viscous consumable substance in a manner that produces a semi-solid consumable substance 300. After achieving the desired consistency, the semi-solid consumable substance 300 may then be shaped, cut, and decorated as desired.

In one embodiment, the viscous consumable substance is a cake mix that is prepared for baking. Though in other embodiments, the viscous consumable substance may include a gel, a mousse, and a liquid. The modulation of the viscous consumable substance may include, baking, frying, barbequing, chilling, freezing, or irradiating in the cavity 110 of the container 102. The semi-solid consumable substance 300 may include a cake, a bread, a gel, or a mousse. It is significant to note that the semi-solid consumable substance 300 is generally soft and easy to cut with a sharp edge. Said another way, the surface of the rack 112 in which cuts the semi-sold consumable substance 300 may be tapered to facilitate in cutting the substance 300.

Figure 2:
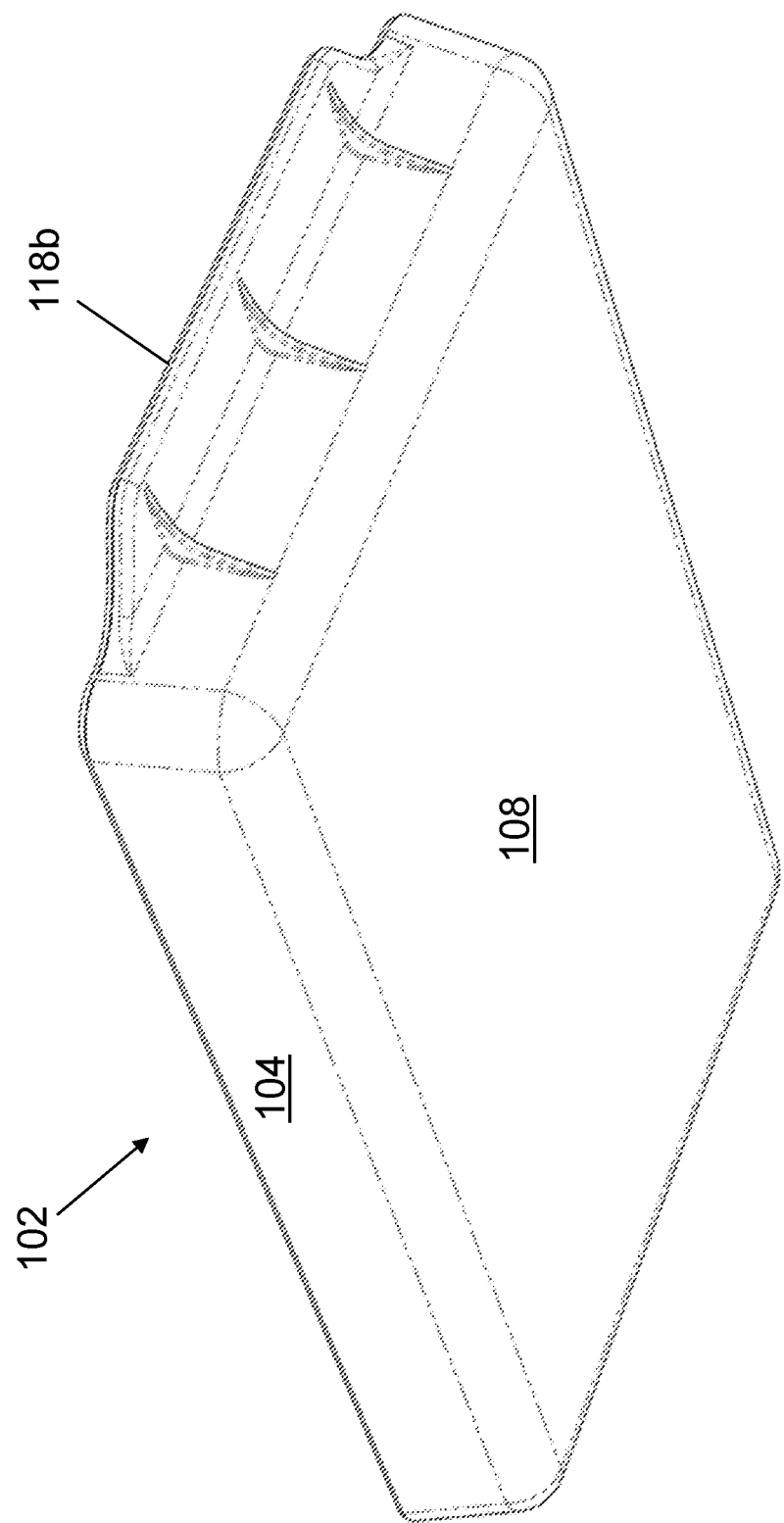
FIG. 2 is a perspective view of a container for receiving and facilitating in modulating a semi-solid consumable substance, in accordance with the present invention.

Looking now at FIG. 2, the container 102 may include a baking pan. Though any cookware that can contain and modulate the viscous consumable substance may be used. Suitable containers may include, without limitation, a baking pan, a cake pan, a cupcake pan, a Bundt pan, a fluted tube pan, a skillet, a frying pan, a slow cooker, a roaster, and a Dutch oven.

In yet another embodiment, the container 102 may be a silicon baking pan having a generally rectangular shape. Though any shape and dimension of the container 102 may be used. The container 102 is also adapted to maintain structural integrity in extreme high or low temperatures. Suitable materials for the container 102 may include, without limitation, stainless steel, iron, titanium, silicone, cookware material, and combinations thereof.

The container 102 forms a mold for the modulated semi-solid consumable substance 300. As discussed below, removing the semi-solid consumable substance 300 from the container 102 is required to shape the semi-solid consumable substance 300 with the shaping rack 112. Thus, after forming, the semi-solid consumable substance 300 may be removed from the container 102 by shaking and flipping/inverting the container 102 so that the base surface 108 of the container is elevated over the perimeter edge 106 of the container 102. This agitation causes the semi-solid consumable substance 300 to fall out. Further, an oil may be used to coat the sidewalls 104 of the container 102, to facilitate in removal of the semi-solid consumable substance 300.

Figure 3:
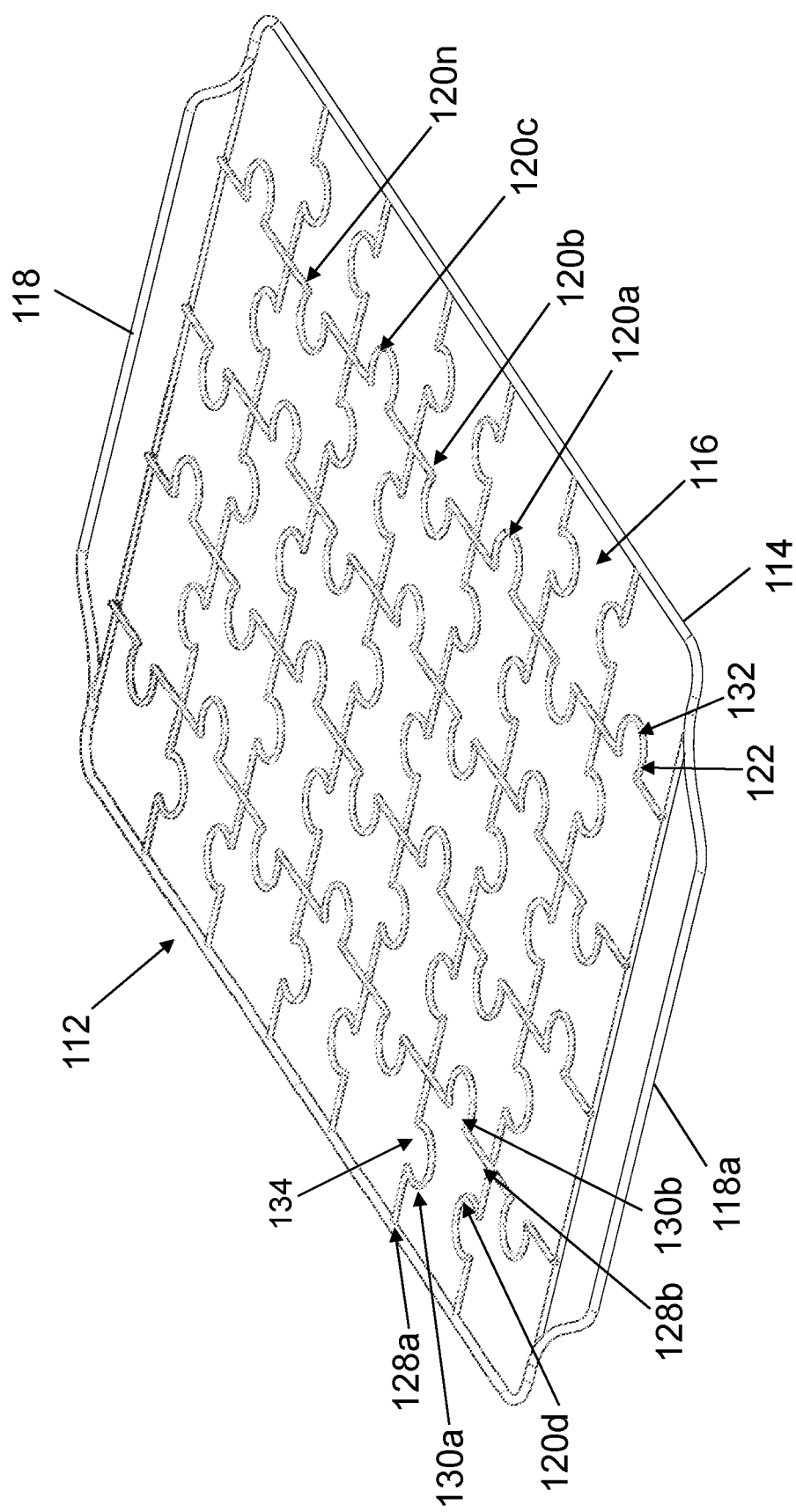
FIG. 3 is a perspective view of a shaping rack having nonlinear profiles, in accordance with the present invention.

As illustrated in FIG. 3, the device 100 also comprises a substantially planar shaping rack 112. The shaping rack 112 is the component that shapes, cuts, and forms the semi-solid consumable substance 300 into consumable substance units 302a, 302b, 302n. Specifically, the shaping rack 112 superimposes the semi-solid consumable substance 300, and then engages and penetrates the surface of the semi-solid consumable substance 300 to a predetermined depth. This penetration into the semi-solid consumable substance 300 forms multiple consumable substance units 302a, 302b, 302n that are shaped to follow a geometric pattern of the plurality of framed sub-sections 120a, 120b, 120c, 120n that make up the shaping rack 112.

Figure 4:
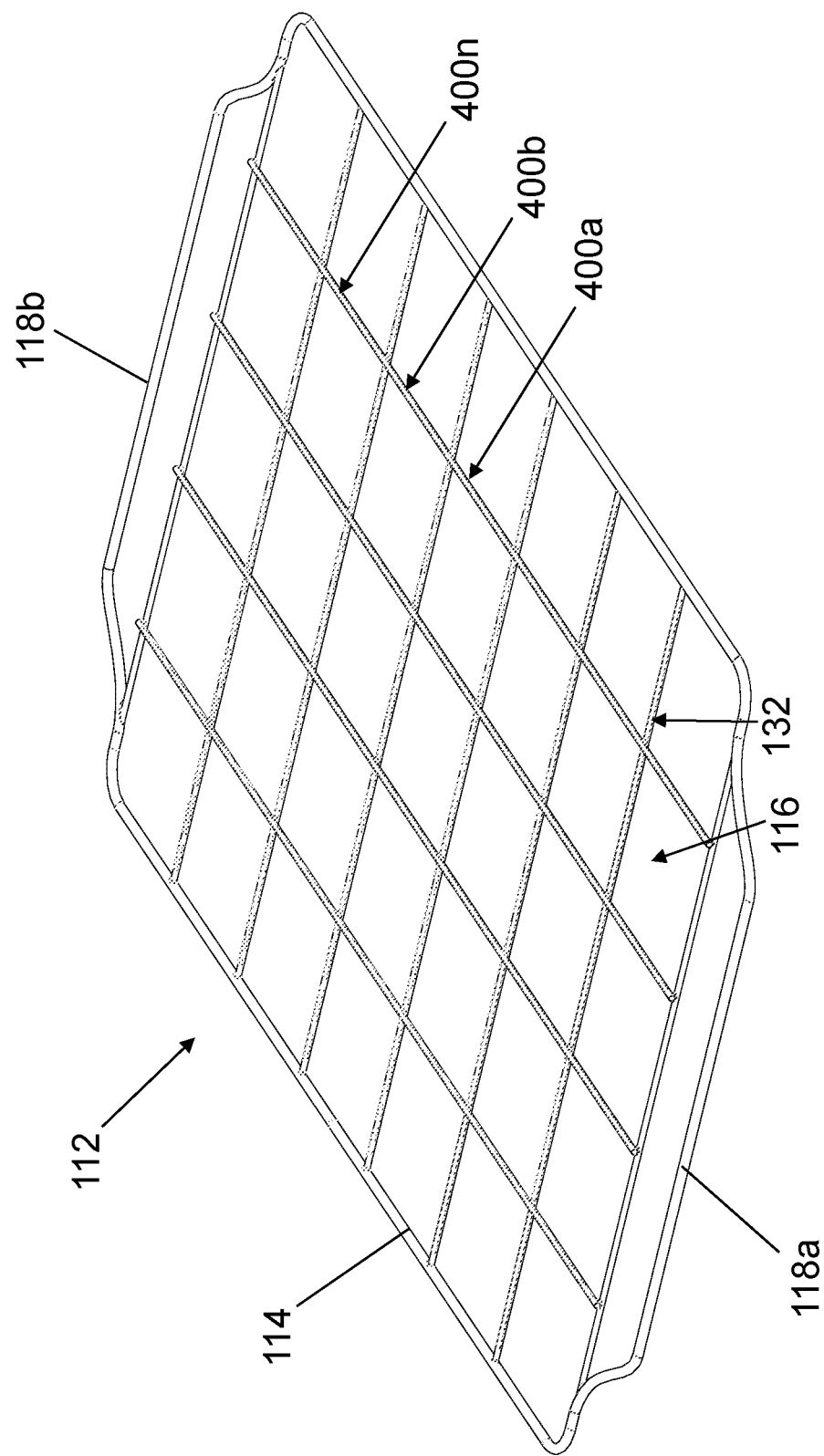
FIG. 4 is a perspective view of a shaping rack having linear profiles, in accordance with the present invention.

Turning now to the top view of the shaping rack 112 shown in FIG. 4, it will be appreciated by those of skill in the art how the geometric shapes that define the shaping rack 112 are translated through the semi-solid consumable substance 300. The rigid composition of the shaping rack 112, with the sharp edges 132, easily penetrates a semi-solid consumable substance 300, such as a cake. In this manner, the shaping rack 112 can be manipulated against the semi-solid consumable substance 300 to form the geometric shapes on the surface of, and through the middle sections of the semi-solid consumable substance 300. This shaping and decorating functionality can be especially useful for a cake.

Figure 5:
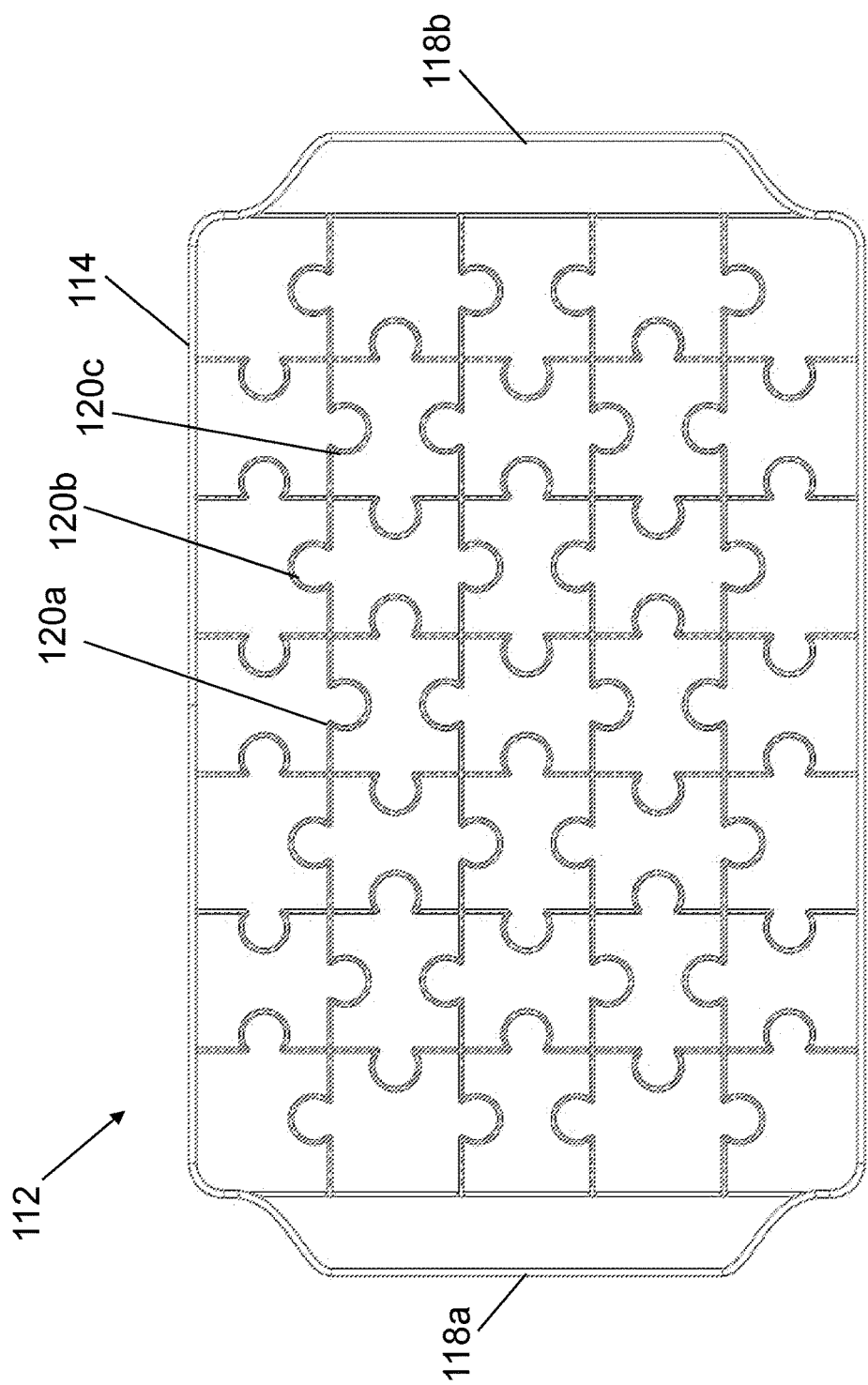
FIG. 5 is a top plan view of the shaping rack shown in FIG. 3, in accordance with the present invention.
Figure 6:
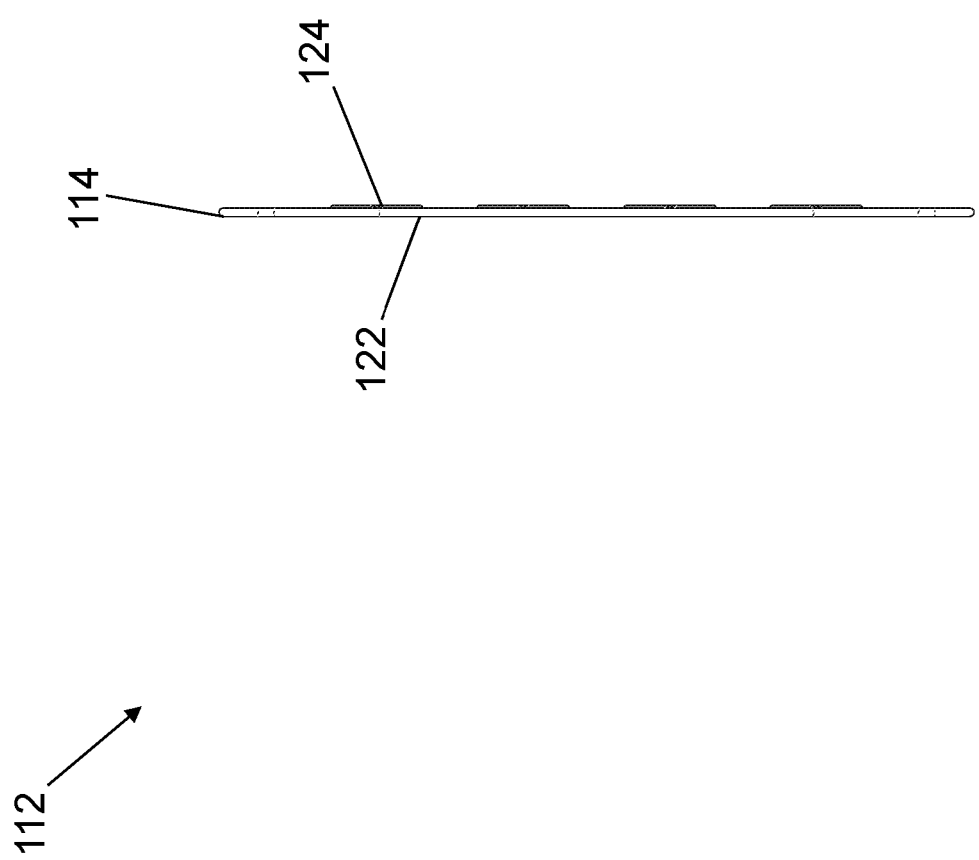
FIG. 6 is an elevational side view of the shaping rack shown in FIG. 3 disposed vertically, in accordance with the present invention.
Figure 7:
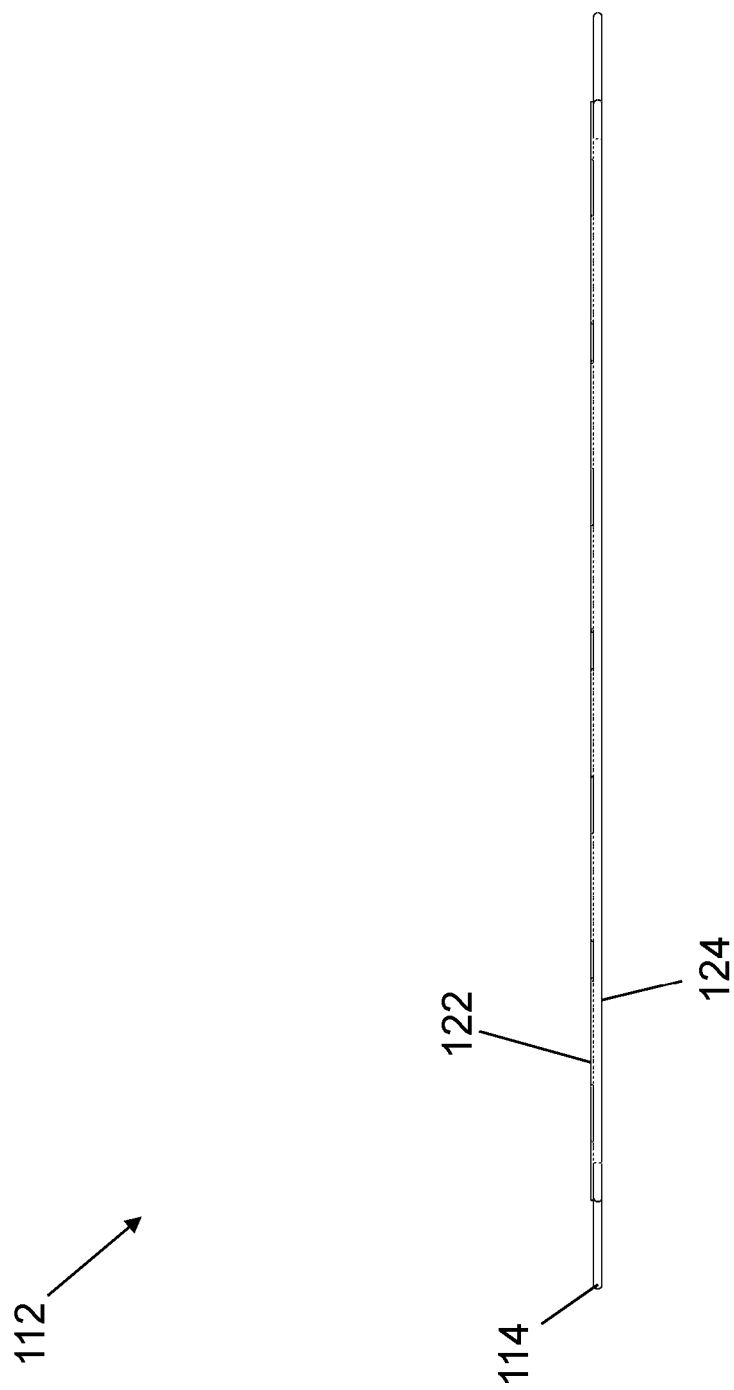
FIG. 7 is an elevational side view of the shaping rack shown in FIG. 3 disposed horizontally, in accordance with the present invention.

Looking at FIGS. 5 and 6, a continuous perimeter frame section 114 forms around the shaping rack 112. The perimeter frame section 114 has generally the same perimeter dimensions as the perimeter edge 106 of the container 102, e.g., ranging from 50-70". In one embodiment, the perimeter edge 106 of the container 102 is shaped to receive, contour, and/or retain the perimeter frame section 114 of shaping rack 112, e.g., the perimeter edge 106 has a concave shape. The similarity in perimeter size of the rack 112 and container 102 allows the shaping rack 112 to superimpose the container 102 and the semi-solid consumable substance 300. In one embodiment, the perimeter frame section 114 is rectangular to emulate the shape of container 102, although other shapes may also be used in other embodiments.

Furthermore, because the shaping rack 112 is engaging a food product, a suitable material for the shaping rack 112 is stainless steel. Though in other embodiments, iron, titanium, metal alloys, and silicone could be used to fabricate the shaping rack 112.

Referring now to FIGS. 3-5, the perimeter frame section 114 encloses a framed shaping section 116. The framed shaping section 116 is defined by a plurality of framed sub-sections, e.g., sub-sections 120a, 120b, 120c, 120n, having a geometric shape. The geometric shapes may include a series of crisscrossing nonlinear profiles, e.g., profiles 130a, 134. Using sub-section 120d as an example, the framed sub-sections 120a-n each also have at least a first side 128a having a first side non-linear profile 130a. Substantially orthogonal with respect to the first side 128a, or within +/−10° of 90°, the framed sub-sections may also each include a second side 128b. The second side 128b may have a second side non-linear profile 130b different than the first side non-linear profile 130a. The nonlinear profiles 130a, 130b are the contours that form the geometric shapes. As seen in the figures, some of the sub-sections may also have a third side substantially parallel to the first side 128a, wherein the third side includes a third side non-linear profile that may be different than, or perhaps symmetrical to, the first side non-linear profile 130a.

The nonlinear profiles 130a, 130b can take numerous shapes, dimensions, and patterns. The nonlinear profiles 130a, 130b that form in the framed sub-sections 120a-c may include, without limitation, a puzzle shape, a square shape, a circle shape, a triangle shape, an irregular polyhedron shape, a figure, a face, and an animal. For example, FIG. 3 illustrates exemplary puzzle shaped nonlinear profiles.

However, in an alternative embodiment, FIG. 4 illustrates a square geometric pattern to make, for example, petits fours. In this embodiment, the square pattern forms in a square framed shaping section 116 that encloses a plurality of square framed sub-sections 400a, 400b, 400n. The square framed sub-sections 400a, 400b, 400n may also include sides that form linear profiles. The linear profiles may also be configured to cross normally to define a square pattern.

In another alternative embodiment, both framed sub-sections 120a-n, 400a-n are interchangeable, and only the perimeter frame section 114 and handles 118a, 118b remain fixed. In operation, however, both the puzzle and square patterns enable the shaping rack 112 to function substantially the same. Thus, the shaping rack 112 includes framed shaping sections 116a, 116b that enclose square framed sub-sections 120a-c, 120d-f forming various geometric shapes. The various shapes, perimeter sections, and edges of the shaping rack 112 enable the semi-solid consumable substance 300 to be shaped, cut, and decorated in eclectic configurations.

Looking specifically at FIGS. 3 and 6, each of the framed sub-sections 120a-c are defined by an upper surface 122 and a bottom surface 124 that may form a relatively sharp edge 132, i.e., tapered and not substantially planar. The sharp edge 132 is configured to engage and penetrate the semi-solid consumable substance 300. The sharp edge 132 may be beveled, serrated, or jagged, depending on the cutting needs for the semi-solid consumable substance 300.

In some embodiments, the shaping rack 112 includes a pair of handles 118a, 118b that extend from opposite sides of the continuous perimeter frame section 114. The handles 118a, 118b provide a graspable surface to manipulate the shaping rack 112, and also to urge the shaping rack 112 against the surface, and through the middle section, of the semi-solid consumable substance 300. The handles 118a, 118b are also efficacious for abutting a pair of blocks 126a, 126b while the framed shaping section 116a passes through the semi-solid consumable substance 300, to restrict penetration through the semi-solid consumable substance 300 past a predetermined depth.

In one embodiments, the handles 118a-b are integrally form on, and extend outwardly from, the perimeter frame section 114. The handles 118a-b may also be generally coplanar with the substantially planar shaping rack 112. In cases where the shaping rack 112 is rectangular, the handles 118a-b may be elongated, extending along the length of the shorter perimeter frame section 114. Though in other embodiments, the handles 118a-b may form along any of the perimeter frame sections 114. The handles 118a-b may be fabricated from the same material as the shaping rack 11 and/or may also be fabricated from a thermally nonconductive material to protect the hands against heat when handling a hot container.

With reference to FIGS. 11-14, in some embodiments, a pair of blocks 126a, 126b are used to support the handles 118a, 118b. The blocks 126a, 126b may include a solid member that is configured to support the handles 118a, 118b in an even plane and at a set height. Thus, the blocks 126a, 126b restrict penetration of the shaping rack 112 through the semi-solid consumable substance 300 past a predetermined depth. Thus, the blocks 126a, 126b restrict the shaping rack 112 from penetrating through the semi-solid consumable substance 300 to a desired depth.

Furthermore, once the framed shaping section 116a of the shaping rack 112 has cut through the semi-solid consumable substance 300 to the predetermined depth, a cross section of the semi-solid consumable substance 300 can be cut lengthwise. Further, the semi-solid consumable substance 300 can be coated with a creamy glaze after being cut, since the shaping rack 112 also serves as a stabilizer to the shape of the semi-solid consumable substance 300.

With reference now to FIGS. 8-14, said figures will now be described in conjunction with the process flow chart of FIG. 15. Although FIG. 15 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 15 for the sake of brevity. In some embodiments, some or all of the process steps included in FIG. 15 can be combined into a single process.

A method 1500 for shaping a baked good has been disclosed that provides a container 102 that receives a viscous consumable substance, and then modulates the viscous consumable substance to form a semi-solid consumable substance 300. A shaping rack 112 engages the semi-solid consumable substance 300 to enable creative and decorative shaping and frosting of the semi-solid consumable substance 300. The shaping rack 112 comprises a perimeter frame section 114 that encloses a framed shaping section 116a. The framed shaping section 116a is defined by a plurality of framed sub-sections 120a-n that can form various geometric shapes.

Further, the method 200 enables the shaping rack 112 to be superimposed over the semi-solid consumable substance 300. Since the perimeter frame section 114 of the shaping rack 112 is substantially the same as the perimeter edge 106 of the container 102, an aligned superimposition is possible.

Upon superimposition, the shaping rack 112 translates, with a sharp edge 132, toward a bottom surface 1002 of the semi-solid consumable substance 300. In translation, the shaping rack 112 penetrates through a middle section of the semi-solid consumable substance 300 to a predetermined depth. This results in the formation of the unitary semi-solid consumable substance 300 into a plurality of consumable substance units 302a, 302b, 302c that correspond in shape, respectively, to the geometric shapes of the framed sub-sections 120a-n. Additionally, the process 1500 may also include a pair of blocks 126a-b on opposite ends of the semi-solid consumable substance 300 that restrict penetration by the shaping rack 112 past a predetermined depth.

The method 1500 may include an initial step 1502 of providing a container 102 having a base surface 108 and sidewalls 104, wherein the sidewalls 104 extend from the base surface 108 and terminating at a perimeter edge 106. The sidewalls 104 and the base surface 108 also define a cavity 110. The container 102 is the vessel that retains a viscous consumable substance in preparation for baking or freezing, so as to produce the semi-solid consumable substance 300. After modulation in the container 102, which may come in the form of heat, microwaves, among others, the semi-solid consumable substance 300 may be shaped, cut, and decorated as desired.

Figure 8:
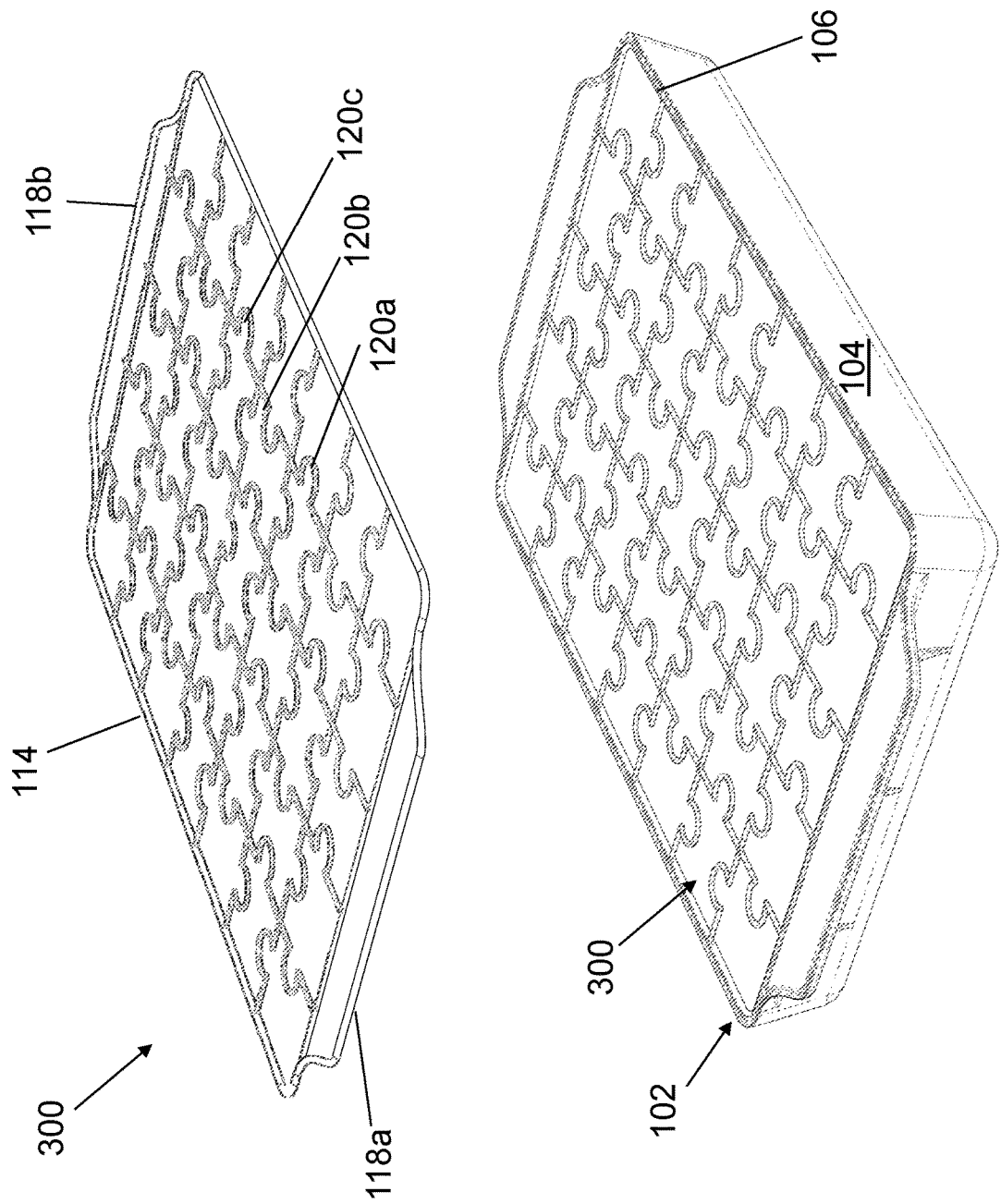
FIG. 8 is a perspective view of the device for shaping baked goods, showing the shaping rack in an overlapping configuration with the container, in accordance with the present invention.

As referenced in FIG. 8, the method 1500 may further include a step 1504 of providing a substantially planar shaping rack 112 having a continuous perimeter frame section 114 enclosing a framed shaping section 116a, the framed shaping section 116a including a plurality of framed sub-sections 120a-n enclosing and defining a plurality of geometric shapes, each of the plurality of framed sub-sections having an upper surface 122, a bottom surface 124 defined by a sharp edge 132, a first side 128a having a first side non-linear profile 130a, and a second side 128b disposed at an orthogonal orientation with respect to the first side 128a and having a second side non-linear profile 130b different than the first side non-linear profile 130, a pair of handles 118a-b extending from the continuous perimeter frame section 114 of the shaping rack 112, the pair of handles 118a, 118b being oppositely disposed on the perimeter frame section 114.

The shaping rack 112 is a generally flat, rigid member that superimposes the container 102 to press against and penetrate the semi-solid consumable substance 300. This engagement creates the geometric shape at a desired depth in the semi-solid consumable substance 300. The shaping rack 112 forms the geometric shapes in a series of criss-crossing frame sub-sections 120a-n defined by nonlinear profiles 130a-n. The frame sub-sections 120a-n can take numerous shapes, dimensions, and patterns. The shaping rack 112 also provides handles 118a, 118b for manipulation and a perimeter frame section 114 for scraping excess creamy glaze from the semi-solid consumable substance 300.

In some embodiments, step 1506 includes placing a viscous consumable substance within the cavity 110. This viscous consumable substance can include a viscous cake mix, a batter, a gel, or a liquid that pours into the mold of the cavity 110. Step 1508 includes modulating the liquid-based consumable substance until it becomes at least a semi-solid consumable substance 300 defined by an upper face and a lower face that is adjacent to the base surface 108 of the container 102. Again, the modulating may include, without limitation, baking, broiling, barbequing, chilling, freezing, or transmitting infrared or other electromagnetic energy onto the viscous consumable substance until it achieves at least a partially solid state as a cake, or other edible product.

Step 1510 may include superimposing the planar shaping rack 112 on the upper surface of the semi-solid consumable substance 300 with the continuous perimeter frame section 114 contouring the perimeter edge 106 of the container 102. FIG. 8 shows the shaping rack 112 superimposed directly above the container 102 that contains the semi-solid consumable substance 300. The perimeter frame section 114 of the shaping rack 112 has dimensions about the same as the perimeter edge 106 of the container 102. In this manner, the shaping rack 112 can be placed directly over the container 102, with the bottom surface 124 and sharp edge 132 of the shaping rack 112 aligned with, and oriented towards the base surface 108 of the container 102.

Figure 9:
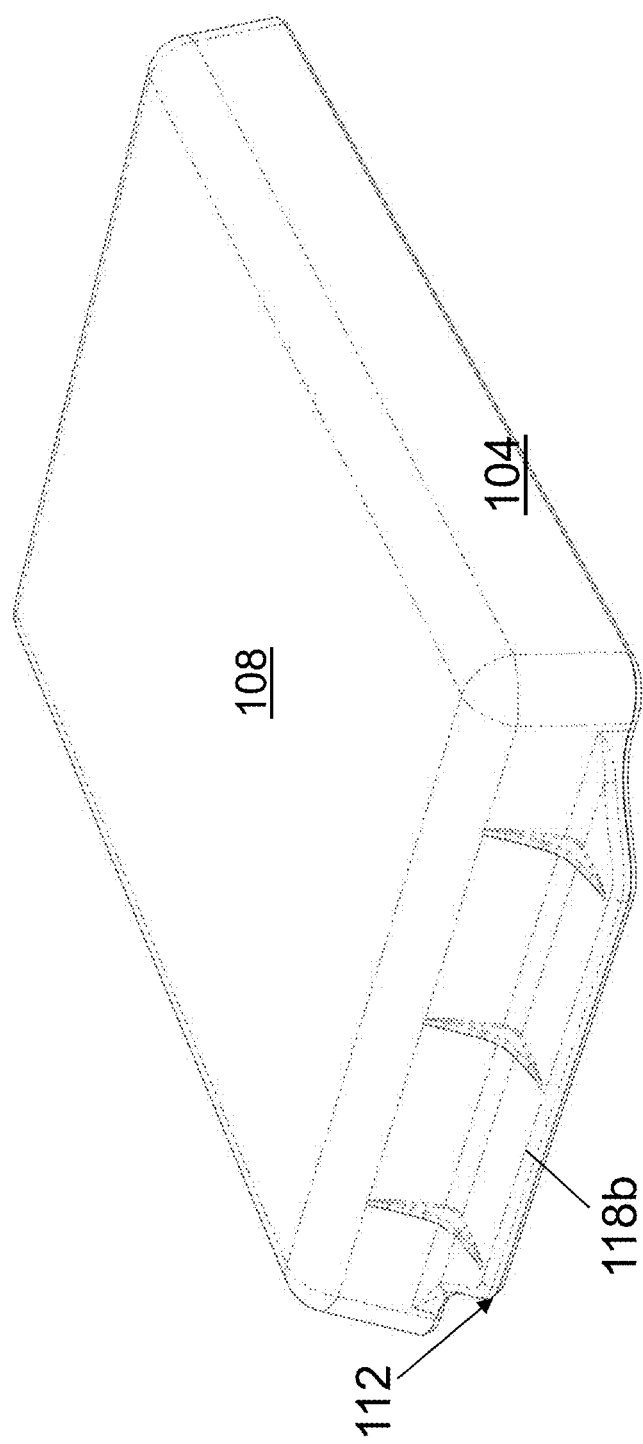
FIG. 9 is a perspective view of the container inverted and containing the semi-solid consumable substance, in accordance with the present invention.

Looking at FIGS. 9-10, a step 1512 comprises inverting the container 102 and the planar shaping rack 112. The container 102 is inverted so that gravity and a small shaking force urges the semi-solid consumable substance 300 to fall out, or easily pried out of the cavity 110 of the container 102, as shown in FIG. 10. In some embodiments, the sidewalls 104 of the container 102 may be coated with a lubricant to facilitate removal of the semi-solid consumable substance 300 from the container 102.

Figure 11:
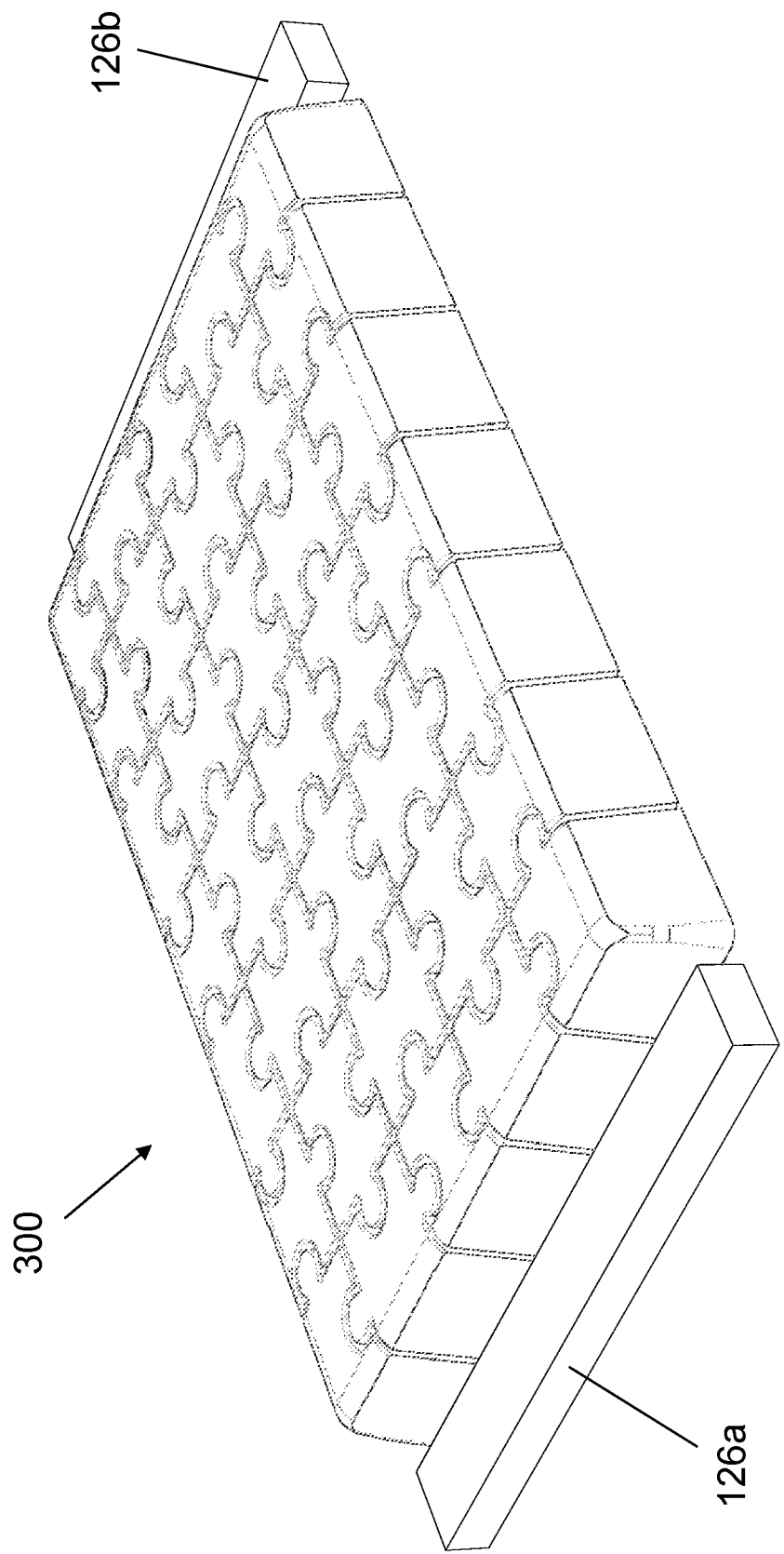
FIG. 11 is a perspective view of a pair of blocks on opposite ends of the semi-solid consumable substance, in accordance with the present invention.
Figure 12:
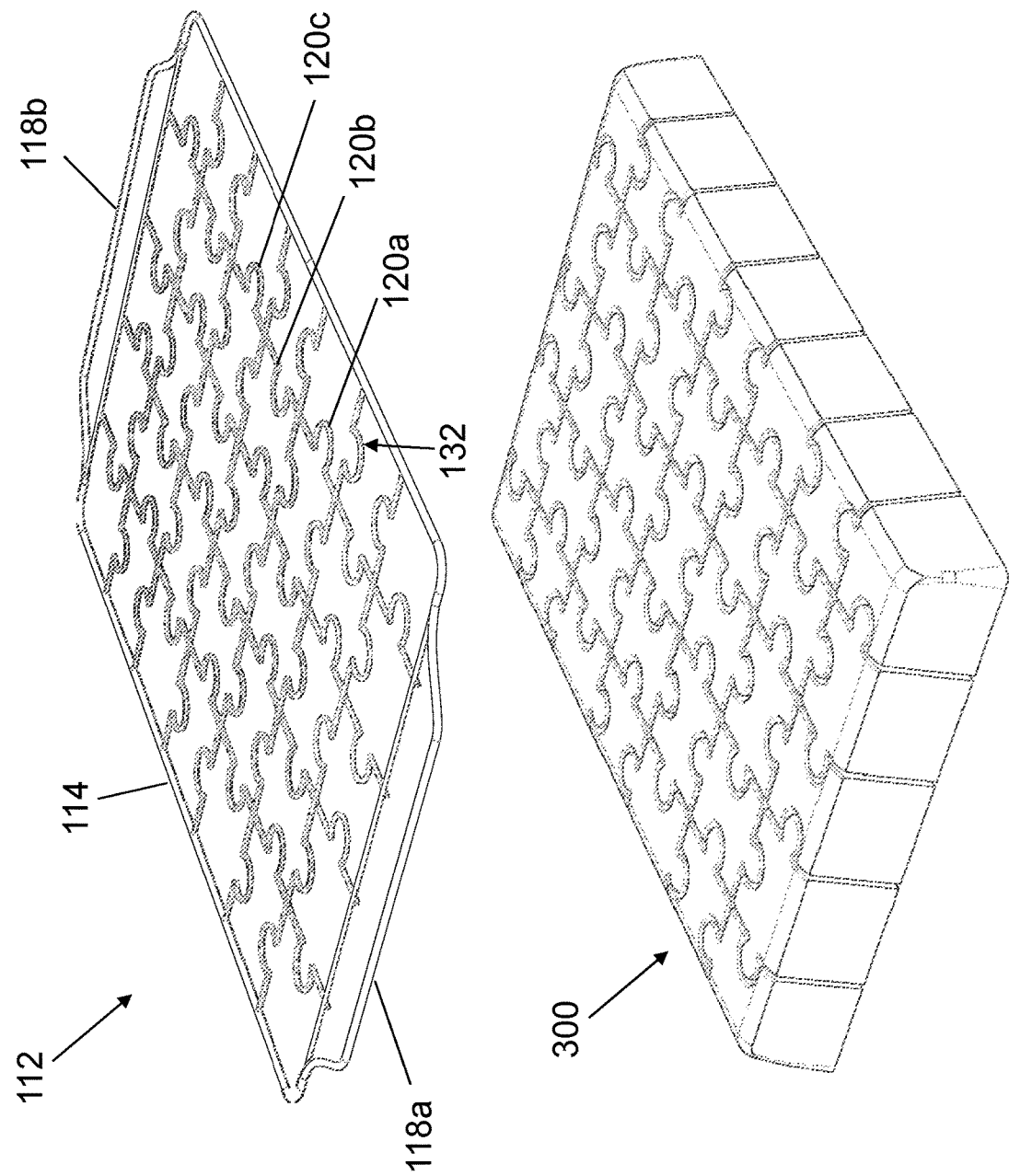
FIG. 12 is a perspective view of the shaping rack superimposed over the semi-solid consumable substance, in accordance with the present invention.

Another Step 1514 that is shown in FIG. 11, includes providing a pair of blocks 126a-b on opposite ends of the semi-solid consumable substance 300, the pair of blocks 126a-b configured to support the pair of handles 118a-b, whereby the shaping rack 112 is elevated above the semi-solid consumable substance 300 when the pair of handles 118*a-b* rest on the pair of blocks 126*a-b*.

In one possible embodiment, the blocks 126*a-b* rest on opposite sides of the semi-solid consumable substance 300. The blocks 126*a-b* serve primarily to operate with the handles 118*a-b* that extend from the perimeter frame section 114 of the shaping rack 112. The blocks 126*a-b* are sized and dimensioned to engage the handles 118*a-b*, and thereby restrict the shaping rack 112 from passing completely through the semi-solid consumable substance 300 as the shaping rack 112 translates onto the semi-solid consumable substance 300. Though in other embodiments, where the shaping rack 112 requires completely passing through the semi-solid consumable substance 300, use of the blocks 126*a-b* is not required.

In some embodiments, the blocks 126*a-b* may include a pair of rectangular solid members having a straight configuration and a length that is substantially the length of two sides of the semi-solid consumable substance 300. The height of the blocks 126*a-b* is determinative of the depth the shaping rack 112 can penetrate the semi-solid consumable substance 300. Though in other embodiments, the blocks 126*a-b* can include any shape or dimension of a solid supportive member having a defined height and length. Suitable materials for the blocks 126*a-b* may include, without limitation, wood, stainless steel, metal, and a rigid polymer.

Continuing further, step 1516 may include translating (as exemplified in FIG. 10 with arrow and numeral 1000, even though FIG. 10 depicts the sharp edge 132 already translated), with the sharp edge 132 of the plurality of framed sub-sections 120*a-c* acting as a leading edge, toward the bottom surface 1002 of the semi-solid consumable substance 300 to a predetermined depth. Looking at FIG. 12, the shaping rack 112 is superimposed directly over the semi-solid consumable substance 300. When translated onto the semi-solid consumable substance 300 by applying a downward force, the sharp edge 132 at the bottom surface 124 of the shaping rack 112 can cut through the relatively soft semi-solid consumable substance 300. As discussed above, the depth of the penetration may be regulated by the height of the blocks 126*a-b* positioned on each side of the semi-solid consumable substance 300.

This translation of the shaping rack 112 onto the semi-solid consumable substance 300 creates a matching geometric pattern on the outer surface and into the middle of the semi-solid consumable substance 300. As discussed above, the geometric pattern can include a puzzle shape, as shown in the illustrative example of FIG. 1.

Figure 13:
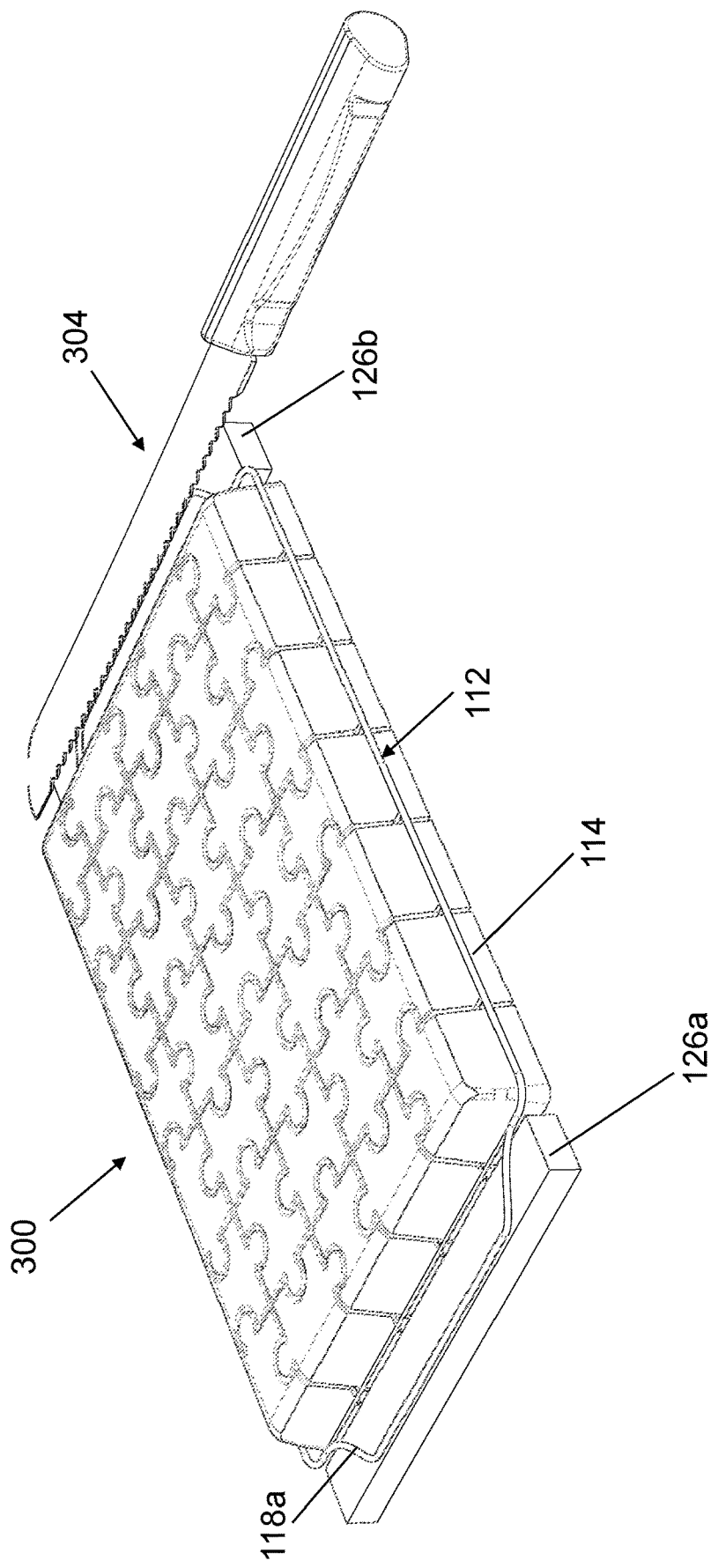
FIG. 13 is a perspective view of a cutting tool cutting a cross section of the semi-solid consumable substance, in accordance with the present invention.

Looking now at FIG. 13, step 1518 includes cutting a cross section of the semi-solid consumable substance 300 across the upper surface 122 of the framed shaping section to the predetermined depth in the semi-solid consumable substance 300. In one embodiment, a cutting tool 304, such as a knife forms the cut lengthwise across the semi-solid consumable substance 300.

In one possible embodiment, the cut separates the semi-solid consumable substance 300 into an upper portion and a lower portion. Though in other embodiments, multiple cross sectional cuts may be formed across the length of the semi-solid consumable substance 300. Further, the orientation of the cut across the semi-solid consumable substance 300 may also cross transversely or at a diagonal orientation.

Figure 14:
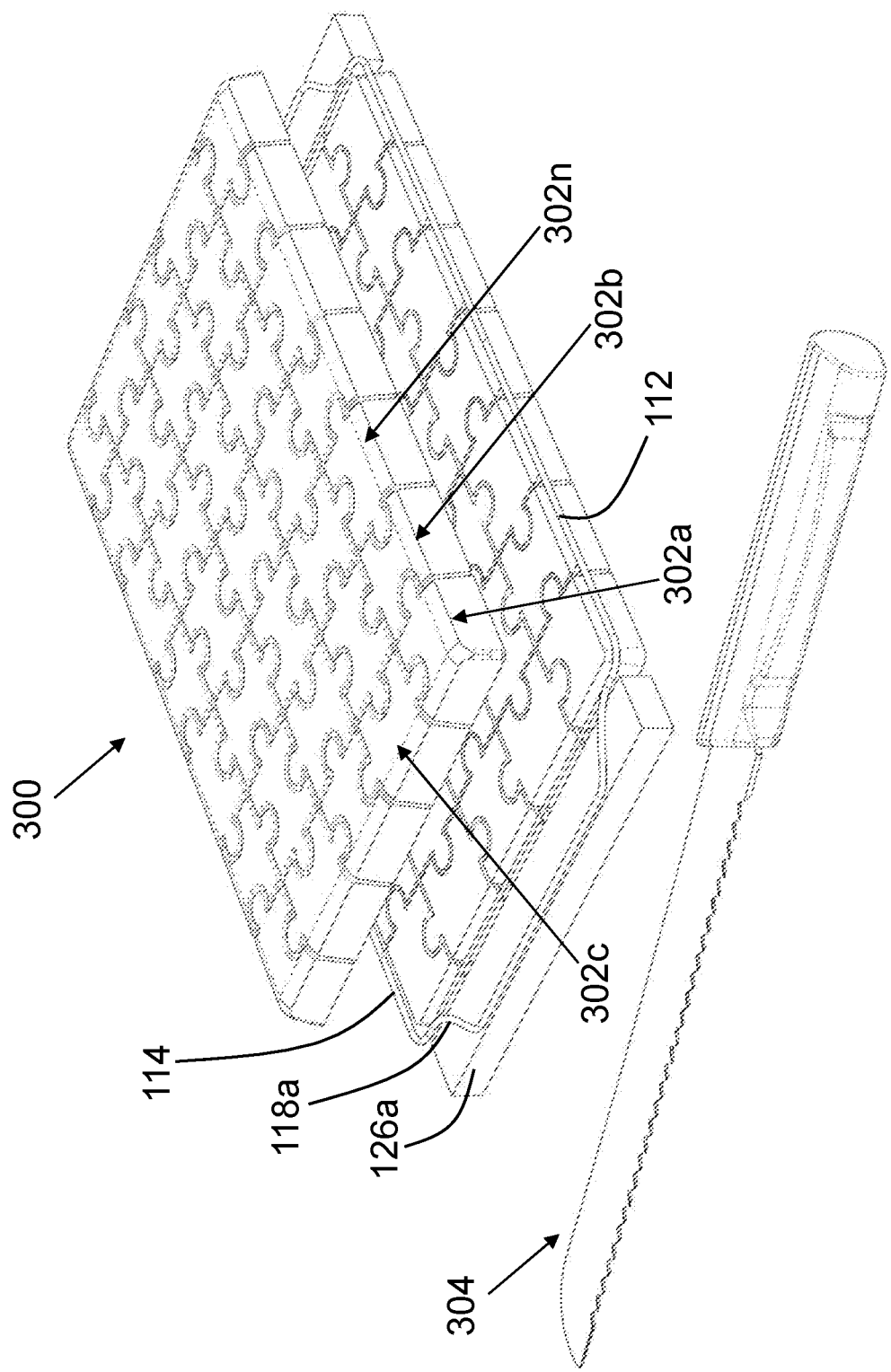
FIG. 14 is a perspective view of an upper section of the semi-solid consumable substance cut into consumable substance units, and a lower section remaining whole, in accordance with the present invention.
Figure 15:
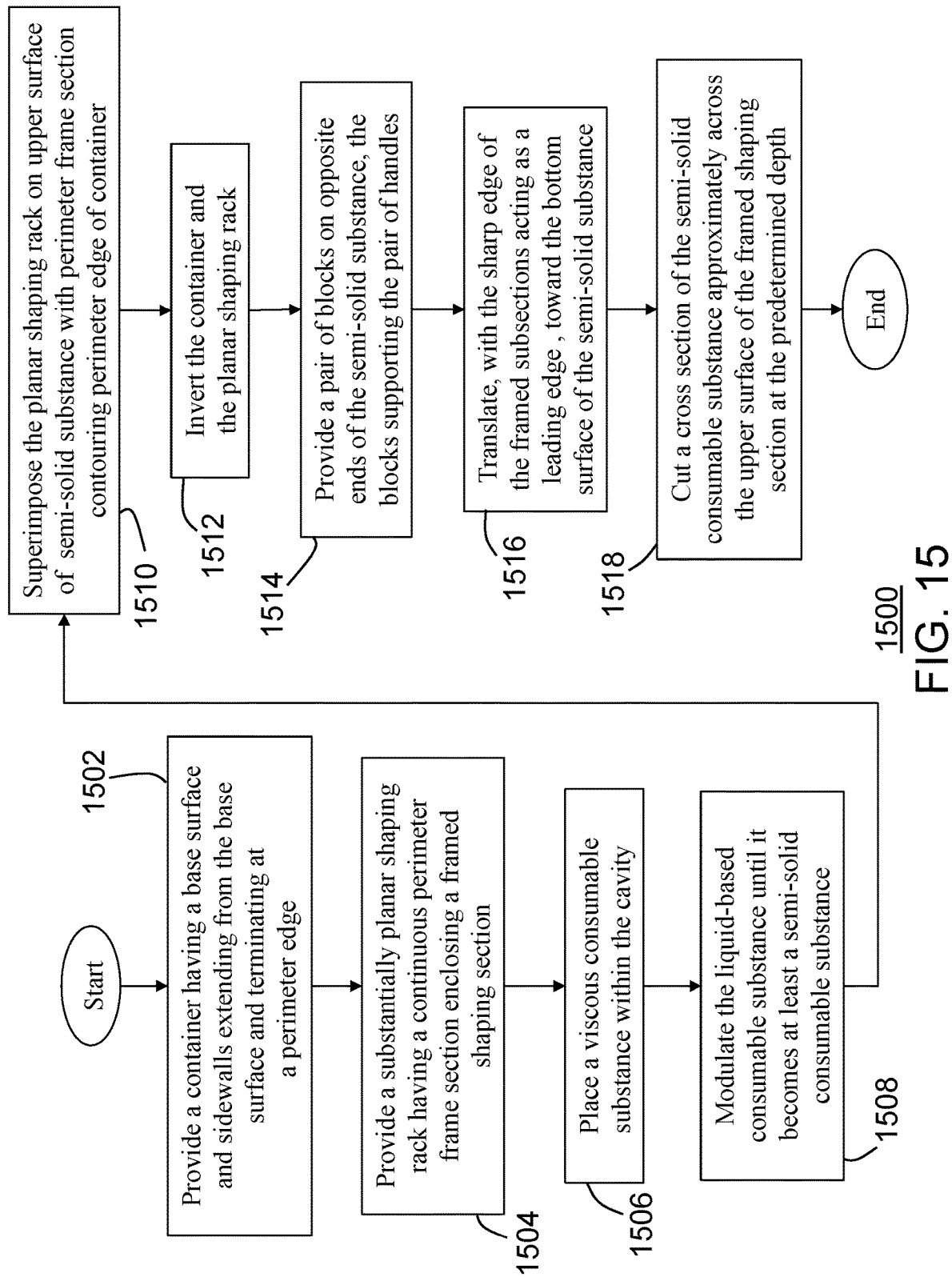
FIG. 15 is a flowchart diagram of an exemplary method for shaping baked goods, in accordance with the present invention

As FIG. 14 shows, an upper cross sectional portion of the semi-solid consumable substance 300 has been penetrated by the shaping rack 112; and thereby forms multiple consumable substance units 302*a*, 302*b*, 302*c*. Conversely, the shaping rack 112 was restricted from penetrating a lower portion of the semi-solid consumable substance 300 by the blocks 126*a-b*. Thus, the lower portion remains intact without forming geometric patterns. However, it is significant to note that a superficial surface of the lower portion may be etched with the geometric pattern, if the shaping rack 112 lightly engages this surface.

In the method 1500, additional steps allow the semi-solid consumable substance 300 to be decorated. For example, a step may include stacking multiple semi-solid consumable substance 300 in an aligned, vertical arrangement. Another step comprises decoratively coating a creamy glaze on the semi-solid consumable substance 300. Yet another step comprises scraping excess creamy glaze from the semi-solid consumable substance 300 with the perimeter frame section 114 of the shaping rack 112. As such, the frame section 114 may be beneficially utilized as a guide or substance stabilizer when inserted through the substance 300 (or thereafter) to frost, de-frost, or otherwise decorate the sub stance.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method for shaping a semi-solid consumable substance comprising the steps of:
    providing a container having a base surface and sidewalls, the sidewalls extending from the base surface and terminating at a perimeter edge, the sidewalls and the base surface defining a cavity;
    providing a substantially planar shaping rack having a continuous perimeter frame section enclosing a framed shaping section and a pair of handles extending from the continuous perimeter frame section of the shaping rack, the handles being oppositely disposed on the perimeter frame, and generally coplanar with the substantially planar shaping rack, the framed shaping section including a plurality of framed sub-sections enclosing and defining a plurality of geometric shapes, each of the plurality of framed sub-sections having an upper surface, a bottom surface defined by a cutting edge, a first side having a first side non-linear profile, and a second side disposed at an orthogonal orientation with respect to the first side and having a second side non-linear profile different than the first side non-linear profile;
    placing a viscous liquid-based consumable substance within the cavity;
    modulating the viscous liquid-based consumable substance until said substance becomes a semi-solid consumable substance defined by an upper face and a lower face adjacent to the base surface of the container;
    superimposing the planar shaping rack on the perimeter edge of the container, with the bottom surface of each of the plurality of framed sub-sections facing toward the cavity;
    inverting the container and the planar shaping rack; and
    translating the planar shaping rack, after the container is removed from the semi-solid consumable substance and with the cutting edge of the plurality of framed sub-sections acting as a leading edge, toward the lower face of the semi-solid consumable substance, thereby forming consumable substance units corresponding in shape, respectively, to the plurality of geometric shapes.

2. The method according to claim 1, further comprising: superimposing the planar shaping rack on the upper face of the semi-solid consumable substance with the continuous perimeter frame section contouring the perimeter edge of the container.

3. The method according to claim 1, further comprising: translating, with the cutting edge of the plurality of framed sub-sections acting as a leading edge, toward the lower face of the semi-solid consumable substance to a predetermined depth.

4. The method according to claim 1, further comprising: providing a pair of blocks on opposite ends of the semi-solid consumable substance, the pair of blocks configured to support the pair of handles after at least partially translating the cutting edge of the plurality of framed sub-sections, whereby the shaping rack is elevated above the upper face of the semi-solid consumable substance when the pair of handles rest on the pair of blocks.

5. The method according to claim 4, further comprising: cutting a cross section of the semi-solid consumable substance across the bottom surface of each of the plurality of framed sub-sections of the framed shaping section at a predetermined depth.

6. The method according to claim 1, wherein: the plurality of framed sub-sections enclose and define a puzzle shape.

7. The method according to claim 1, wherein: the first side non-linear profile of one of the plurality of framed sub-sections corresponds in shape to the first side non-linear profile of another of the plurality of framed sub-sections adjacent thereto and the second side non-linear profile of one of the plurality of framed sub-sections corresponds in shape to the second side non-linear profile of another of the plurality of framed sub-sections adjacent thereto.

8. The method according to claim 1, further comprising: wherein the modulating is baking or freezing the viscous liquid-based consumable substance in the cavity of the container to form the semi-solid consumable substance.

9. A method for shaping a semi-solid consumable substance, the method comprising the steps of:
providing a container having a base surface and sidewalls, the sidewalls extending from the base surface and terminating at a perimeter edge, the sidewalls and the base surface defining a cavity;
providing a substantially planar shaping rack having a continuous perimeter frame section enclosing a framed shaping section, the framed shaping section including a plurality of framed sub-sections enclosing and defining a plurality of geometric shapes, each of the plurality of framed sub-sections having an upper surface, a bottom surface defined by a cutting edge, a first side having a first side non-linear profile, and a second side disposed at an orthogonal orientation with respect to the first side and having a second side non-linear profile different than the first side non-linear profile, a pair of handles extending from the continuous perimeter frame section of the shaping rack, the pair of handles being oppositely disposed on the perimeter frame and generally coplanar with the substantially planar shaping rack;
placing a viscous liquid-based consumable substance within the cavity;
modulating the viscous liquid-based consumable substance until said substance becomes a semi-solid consumable substance defined by an upper face and a lower face adjacent to the base surface of the container;
superimposing the planar shaping rack on the upper face of the semi-solid consumable substance with the continuous perimeter frame section contouring the perimeter edge of the container;
inverting the container and the planar shaping rack;
translating the planar shaping rack, after the container is removed from the semi-solid consumable substance and with the cutting edge of the plurality of framed sub-sections acting as a leading edge, toward the lower face of the semi-solid consumable substance to a predetermined depth;
providing a pair of blocks on opposite ends of the semi-solid consumable substance, the pair of blocks configured to support the pair of handles after at least partially translating the cutting edge of the plurality of framed sub-sections, whereby the shaping rack is elevated above the upper face of the semi-solid consumable substance when the pair of handles rest on the pair of blocks; and
cutting a cross section of the semi-solid consumable substance across the bottom surface of each of the plurality of framed sub-sections of the framed shaping section at the predetermined depth, thereby forming consumable substance units corresponding in shape, respectively, to the plurality of geometric shapes.

\* \* \* \* \*